(12) United States Patent
Takechi et al.

(10) Patent No.: US 7,126,642 B2
(45) Date of Patent: Oct. 24, 2006

(54) IMAGE DISPLAY APPARATUS

(75) Inventors: Aya Takechi, Tokyo (JP); Hiroyuki Kojima, Kanagawa (JP); Nobuo Ueki, Chiba (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 09/956,009

(22) Filed: Sep. 20, 2001

(65) Prior Publication Data

US 2002/0057369 A1 May 16, 2002

(30) Foreign Application Priority Data

Sep. 22, 2000 (JP) ............................. 2000-289347

(51) Int. Cl.
*H04N 11/20* (2006.01)
*H04N 7/01* (2006.01)

(52) U.S. Cl. ...................... 348/445; 348/555; 348/556; 348/558

(58) Field of Classification Search ................ 348/558, 348/554, 555, 556, 445, 449, 744, 715, 716; H04N 11/20, H04N 7/01

See application file for complete search history.

(56) References Cited

U.S. PATENT DOCUMENTS

| 5,353,065 | A | * | 10/1994 | Katsumata et al. | ......... 348/556 |
| 5,392,069 | A | * | 2/1995 | Koyama et al. | ............ 348/239 |
| 5,444,492 | A | * | 8/1995 | Kihara | ....................... 348/445 |
| 5,585,843 | A | * | 12/1996 | Ishizuka et al. | ........ 348/208.13 |
| 5,621,459 | A | * | 4/1997 | Ueda et al. | ................. 348/239 |
| 5,638,485 | A | * | 6/1997 | Kobayashi et al. | ......... 386/123 |
| 6,496,647 | B1 | * | 12/2002 | Arai et al. | .................... 386/95 |

FOREIGN PATENT DOCUMENTS

JP          11-194051           7/1999

* cited by examiner

*Primary Examiner*—Trang U. Tran
(74) *Attorney, Agent, or Firm*—Oblon, Spivak, McClelland, Maier & Neustadt, P.C.

(57) ABSTRACT

There is provided an image display apparatus which automatically detects a picture defect and shifts an image region to eliminate the picture defect. The image display apparatus includes a memory unit for temporarily storing an input image signal, a memory control unit for controlling a readout start address for the memory unit, a display unit to which the image signal read out of the memory unit is supplied, a detection unit of an aspect ratio of the input image signal, and an address control signal generation unit to which an aspect ratio detection output is supplied from the detection unit and which generates a readout start address control signal for the memory unit from the input image signal. When the input image signal having an aspect ratio different from an aspect ratio of image screen display of the display unit is supplied, a readout start address is controlled on the basis of the address control signal generated by the address control signal generation unit. By this, an image region is automatically shifted and a picture defect is prevented without changing the aspect ratio of the input image signal when an object is a human figure.

4 Claims, 13 Drawing Sheets

I-AXIS AND Q-AXIS SYSTEM CONVERSION BLOCK DIAGRAM

FLESH COLOR/LIP JUDGEMENT BLOCK DIAGRAM

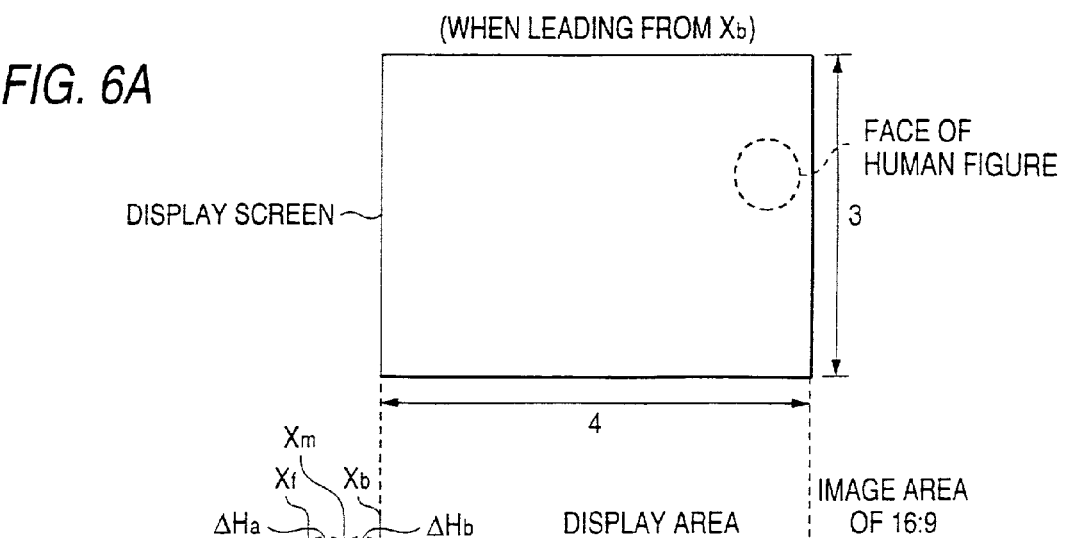
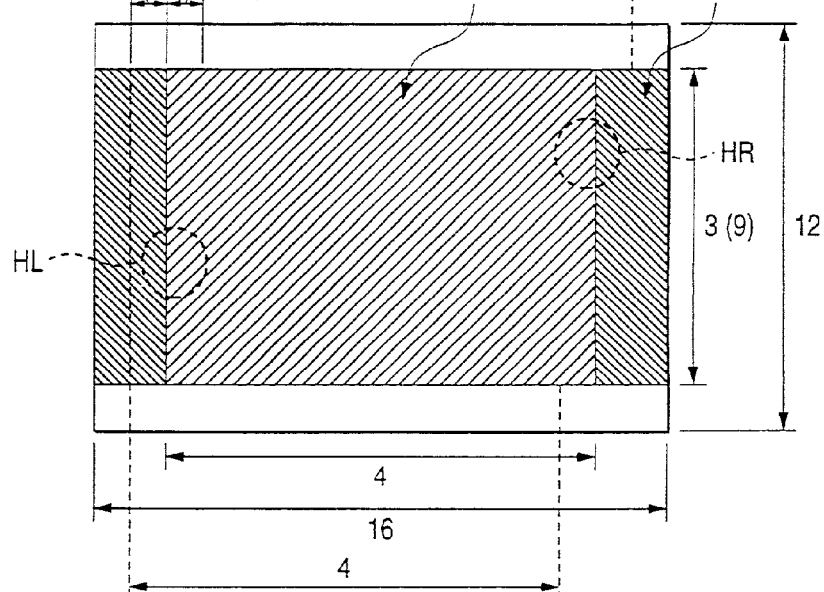
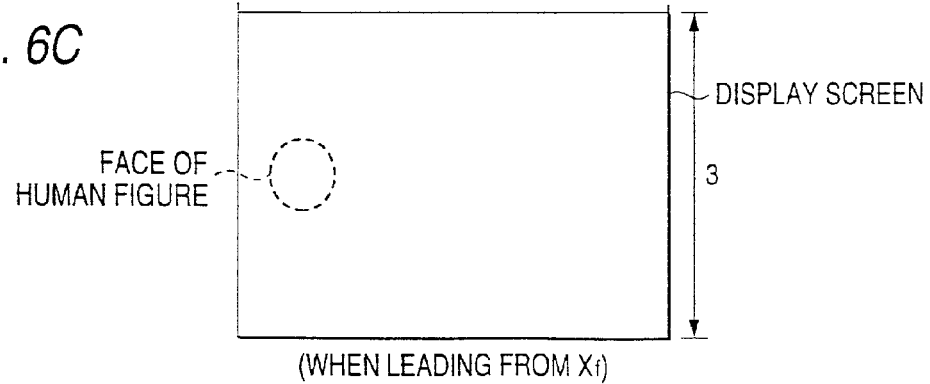

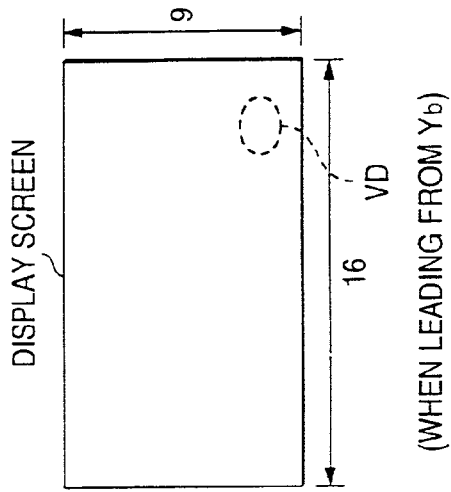
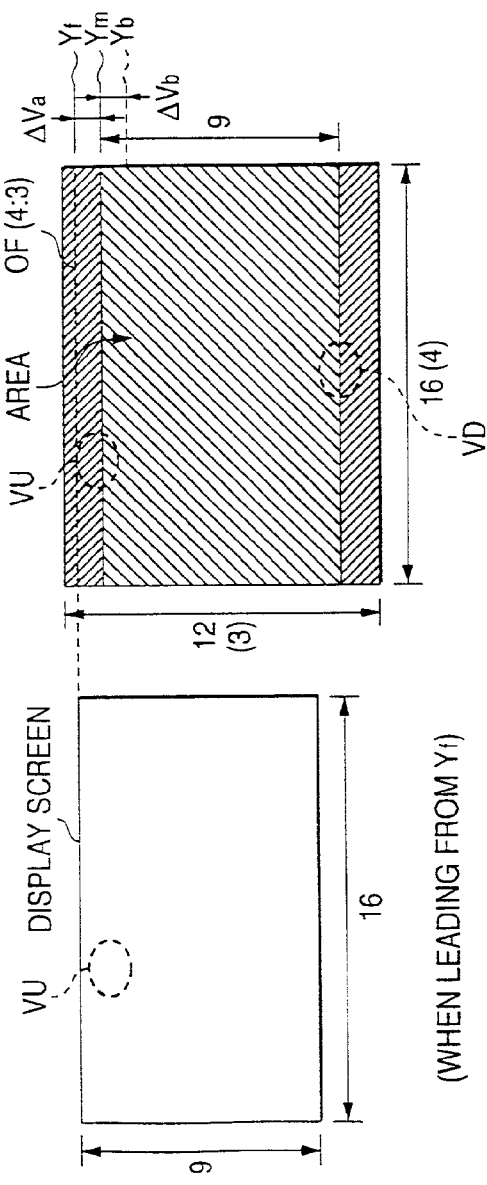

READOUT POSITION OF MEMORY AT THE TIME OF FACE DETECTION

MONITOR
INPUT IS 16:9, DISPLAY IS 4:3

READOUT POSITION OF MEMORY AT THE TIME OF FACE DETECTION

MONITOR
INPUT IS 4:3, DISPLAY IS 16:9

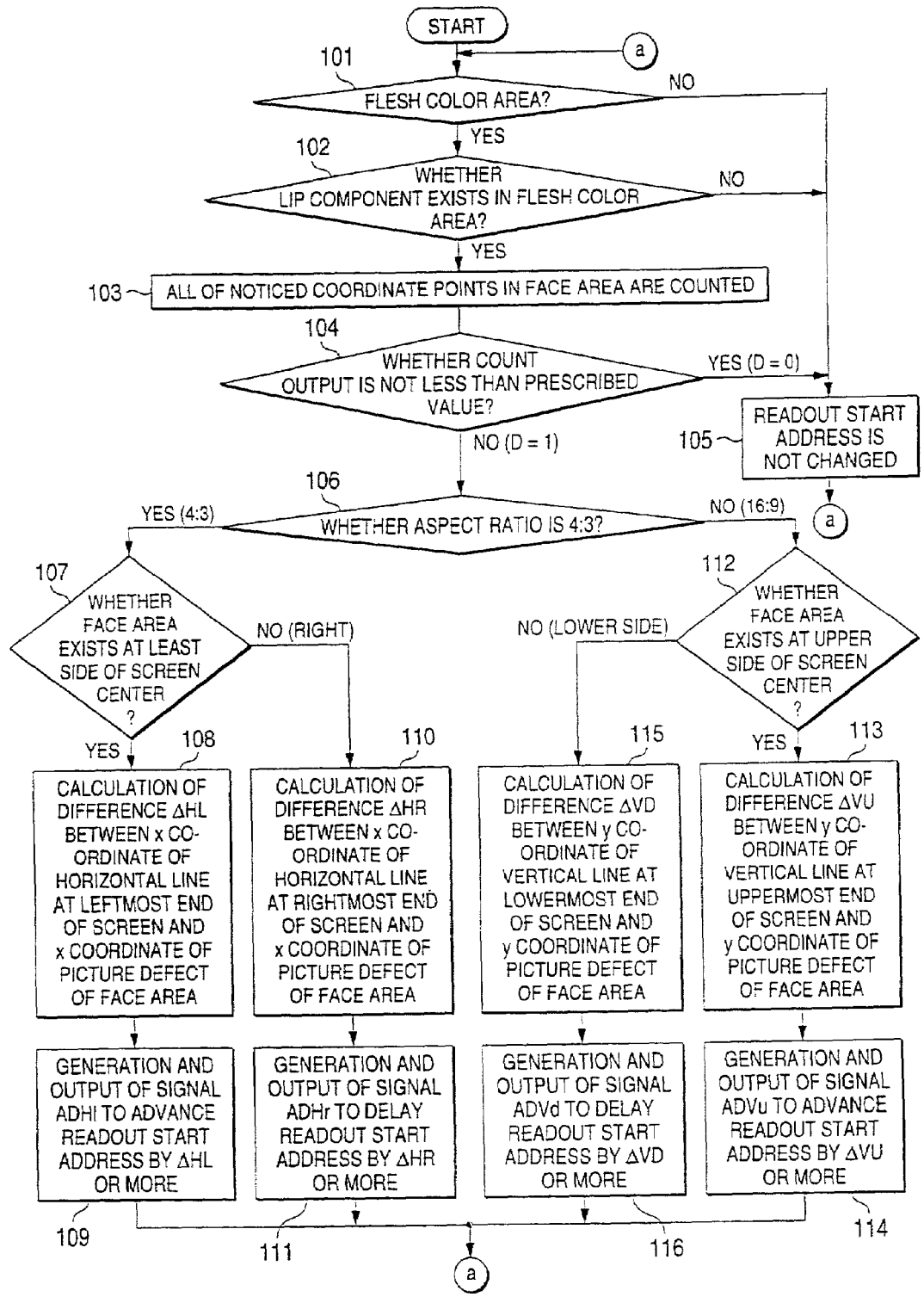

CONCEPTUAL VIEW OF SIGNAL LEVEL AT THE TIME OF TELOP DISPLAY

OCCURRENCE OF NON-SCREEN PORTION

NON-SCREEN PORTION

OCCURRENCE OF NON-SCREEN PORTION

NON-SCREEN PORTION

OCCURRENCE OF PICTURE DEFECT

OCCURRENCE OF PICTURE DEFECT

CUT PORTION

PICTURE DISTORTION

PICTURE DISTORTION

IMAGE DISPLAY APPARATUS

BACKGROUND OF THE INVENTION

1. Field of the Invention

The present invention relates to an image display apparatus capable of correcting a picture defect of a human figure or the like, and more particularly to an image display apparatus in which when an aspect ratio of a screen is different from an aspect ratio of an input image signal, even in the case where an input image is displayed without changing the aspect ratio of the input image signal, a picture defect of a human figure or the like can be automatically corrected.

2. Description of the Related Art

When an image of an input image signal is displayed on a display means having an aspect ratio different from an aspect ratio of the image, in the case where the image is displayed while the aspect ratio of the input image signal is kept, the following image modes are conceivable.

FIG. 14A shows a state in which a display means has an aspect ratio of (4:3) and an input image signal of (16:9) is displayed on this, and in this case, non-screen portions are formed at the upper and lower portions of the screen. FIG. 14B shows a case where an amount of horizontal over scan is increased to eliminate the non-screen portions. Besides, as shown in FIG. 14C, when the image is nonlinearly distorted, all the image can be displayed without a defect.

Similarly, in the case where an image of an input image signal having an aspect ratio of (4:3) is displayed on a screen having an aspect ratio of (16:9), it is possible to conceive a mode in which non-screen portions are attached to the right and left portions as shown in FIG. 14D, a mode in which an amount of vertical over scan is increased as shown in FIG. 14E, or a mode in which the image is nonlinearly distorted and is displayed as shown in FIG. 14F.

Incidentally, such image display processing can be realized by changing the phase or inclination of a deflection signal.

Now, as described above, when the aspect ratio of a screen is different from the aspect ratio of an input image, a part of the image must be sacrificed, a surplus image (non-screen portion) having no influence on the image must be inserted, or the image must be distorted.

Accordingly, it is apparent that the method of attaching the non-screen portions as in FIG. 14A or 14D can not effectively use the display screen. In the method of increasing the amount of over scan as in FIG. 14B or 14E, a picture defect is increased, so that there is a case where lack of information to be displayed occurs.

When the display mode in which the picture defect occurs is adopted, although an image display position for a screen can be adjusted by a user himself, since the display position is fixed after the adjustment, the display position must be always adjusted for every image content in order to prevent the picture defect, which is very inconvenient. In the case of FIG. 14C or 14F in which a nonlinear processing such as a wide zoom processing is performed, although the picture defect is decreased, there is a problem that its circularity can not be held.

Further, since the position where the picture defect occurs is indefinite, there may be a case that information important for the user is defective.

SUMMARY OF THE INVENTION

An object of the present invention is therefore to provide an image display apparatus which automatically judges the occurrence of a picture defect and changes an image display start position so that an image can be displayed without changing the aspect ratio of an input image signal.

In order to solve the above problem, according to a first aspect of the present invention, an image display apparatus comprises memory means for temporarily storing an input image signal, memory control means for controlling a readout start address for the memory means, display means to which the image signal read out of the memory means is supplied, detection means of an aspect ratio of the input image signal, and address control signal generation means to which an aspect ratio detection output is supplied from the detection means, for generating a readout start address control signal for the memory means from the input image signal, wherein when the input image signal having an aspect ratio different from an aspect ratio of image screen display of the display means is supplied, a readout start address for the memory means is controlled on the basis of the address control signal generated by the address control signal generation means, so that a picture defect is prevented without changing the aspect ratio of the input image signal when an object is a human figure.

According to another aspect of the present invention, an image display apparatus comprises memory means for temporarily storing an input image signal, memory control means for controlling a readout start address for the memory means, display means to which the image signal read out of the memory means is supplied and which has an aspect ratio of (4:3), telop signal detection means for detecting a telop signal superimposed on the input image signal, and address control signal generation means for generating an address control signal to control a readout start address for the memory means when the telop signal is detected, wherein when the input image signal having an aspect ratio different from an aspect ratio of image screen display of the display means is supplied and when the telop signal is detected, the readout start address for the memory means is controlled on the basis of the address control signal generated by the address control signal generation means, so that a picture defect of the telop signal is prevented without changing the aspect ratio of the input image signal.

According to this invention, a face of a human figure or a telop is used as information for judging the presence of occurrence of the picture defect. In the case where the face of the human figure is used, it is judged that the area of the detected face of the human figure is positioned at which part on the screen, and when the amount of the picture defect is large, the amount and the direction of movement of the display screen (shift amount and shift direction) are determined, and a readout start position of the memory temporarily storing the input image signal is changed. Since the position of an image displayed on the screen is changed by the readout start position of the memory, the occurrence of the picture defect can be automatically corrected by this. In this case, the shift direction (horizontal direction or vertical direction) of the image display screen is determined from the relation between the aspect ratio of the screen and the aspect ratio of the input image signal.

When the aspect ratio of the screen is (16:9) and the aspect ratio of the input image signal is (4:3), and when an image is displayed on the screen without changing the aspect ratio of the input image signal, the upper and lower portions of the screen become picture defects as in FIG. 14E.

In this case, the telop signal inserted in the input image signal is used as picture defect information. When the telop signal is superimposed, the image screen is shifted to the upper side or the lower side. By this shift processing, the telop information can be projected without a defect.

BRIEF DESCRIPTION OF THE DRAWINGS

FIGS. 6A to 6C are explanatory views of a memory area and picture defect correction on a screen of (4:3).

FIGS. 7A to 7C are explanatory views of a memory area and picture defect correction on a screen of (16:9).

FIG. 9 is a flowchart showing an embodiment of a picture defect correction processing using an aspect ratio, flesh color and the like.

DETAILED DESCRIPTION OF THE PREFERRED EMBODIMENTS

An embodiment of an image display apparatus of the present invention will be described in detail with reference to FIG. 1 and the following.

Figure 1:
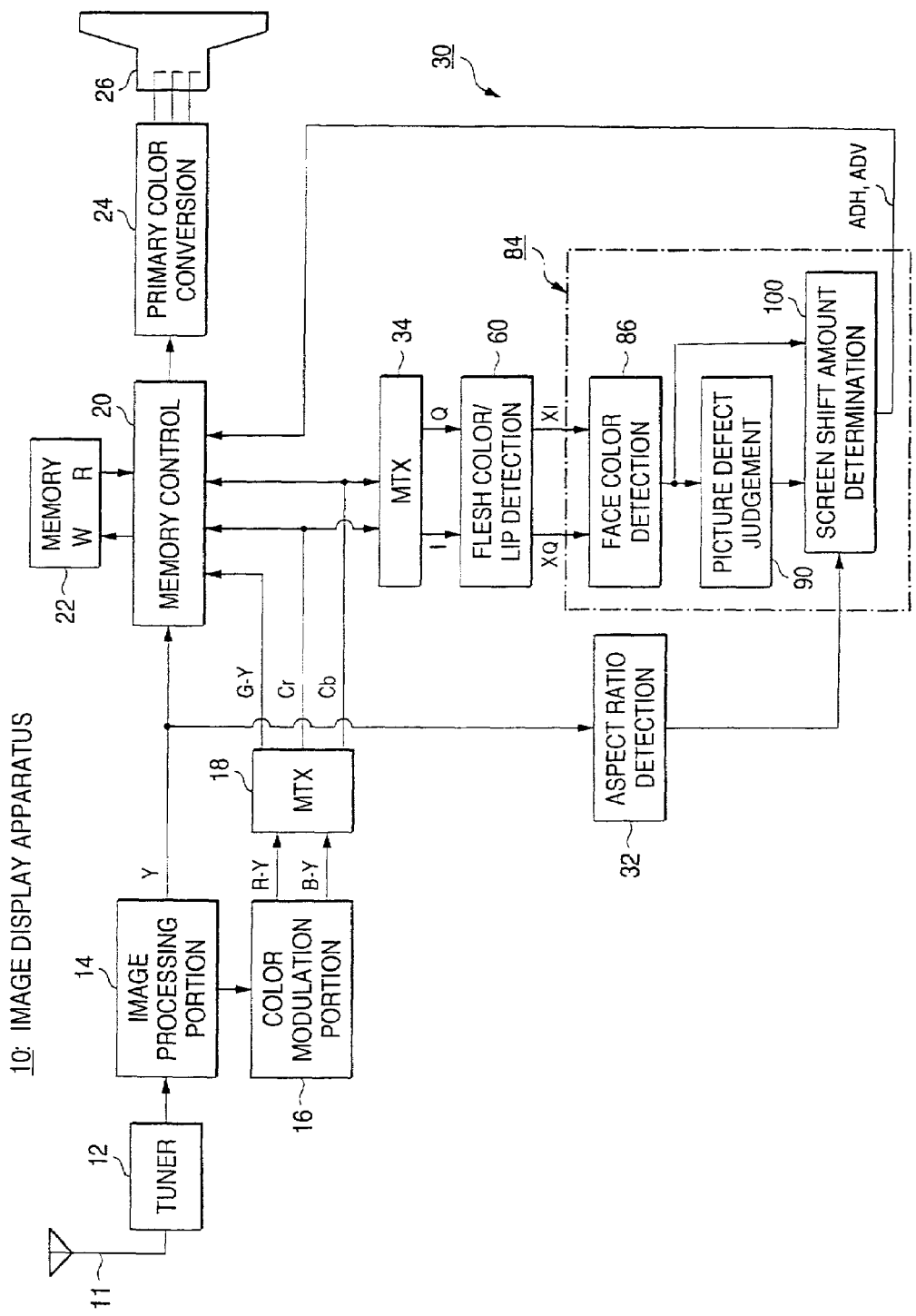
FIG. 1 is a system view of a main portion showing an embodiment of an image display apparatus of the present invention.

In an image display apparatus 10 shown in FIG. 1, an input image signal received by an antenna 11 is tuned by a tuner 12, and the tuned input image signal is supplied to an image processing portion 14 and a luminance signal Y is demodulated. A carrier chrominance signal extracted by the image processing portion 14 is supplied to a color demodulation portion 16, and a pair of color difference signals (R-Y) and (B-Y) are demodulated, and the demodulated color difference signals are supplied to a matrix circuit 18, so that a color difference signal (G-Y) and a pair of chrominance signals Cr and Cb are generated in this example.

On the other hand, the luminance signal Y outputted from the image processing portion 14 is written in a memory means 22 through a memory control portion 20. The color difference signal (G-Y) and the pair of chrominance signals Cr and Cb generated by the matrix circuit 18, together with the luminance signal Y, are also written in the memory means 22 while being controlled by the memory control portion 20. Although a video RAM or the like can be used as the memory means 22, its capacity is such that image signals of an aspect ratio of (4:3) in terms of (16:12) can be temporarily stored. This is because it is also necessary to use, as image display information, image information corresponding to a region which is not displayed on a screen due to a picture defect.

The image information stored in the memory means 22 is again read out and is supplied to an output conversion portion 24, and in this embodiment, it is converted into primary chrominance signals of R, G and B and is supplied to an image display means, in this example, a color cathode ray tube (CRT) 26.

An image defect correction processing for detecting the presence of the occurrence of a picture defect and for calculating a shift amount of image information when the picture defect occurs, is carried out by using the luminance signal Y obtained by the image processing portion 14 and the pair of chrominance signals Cr and Cb generated by the matrix circuit 18.

As information used for detecting the presence of the occurrence of the picture defect, it is conceivable to use a case of using flesh color of a human figure, and a case of using a telop signal inserted in an image signal. The embodiment shown in FIG. 1 is an example of the former, and an address control signal generation means 30 is provided. Since a region of an image displayed on the screen can be changed in any direction of horizontal and vertical directions by controlling a readout start address for the memory means 22 on the basis of an address control signal, an image having no picture defect can be displayed by this.

An embodiment of the address control signal generation means 30 like this will next be described.

The address control signal generation means 30 is provided with an aspect ratio detection means 32. The luminance signal Y is supplied to the aspect ratio detection means 32, and the aspect ratio of the input image signal is detected. In this embodiment, a non-screen signal contained in the input image signal is used as a signal to be detected.

This is devised such that in order to eliminate a feeling of wrongness even when an image of (16:9) is projected on a screen having an aspect ratio of (4:3), in the case of the input image signal having an aspect ratio of (16:9), the upper and lower portions of the screen become non-screen portions (gray). From this, since the non-screen signal exists in the case of the image signal having an aspect ratio of (16:9), the aspect ratio of the input image signal can be detected by detecting the non-screen signal from the received luminance signal.

Figure 14A:
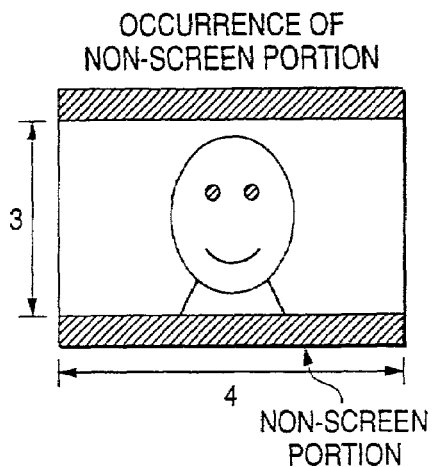
FIGS. 14A to 14F are explanatory views showing the relation between the aspect ratio and the picture defect.
Figure 14D:
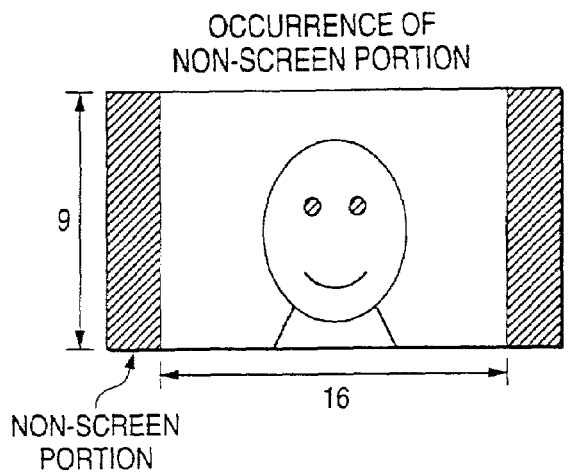
Figure 14B:
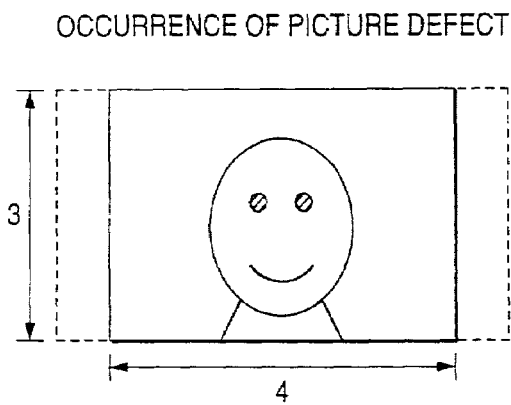
Figure 14E:
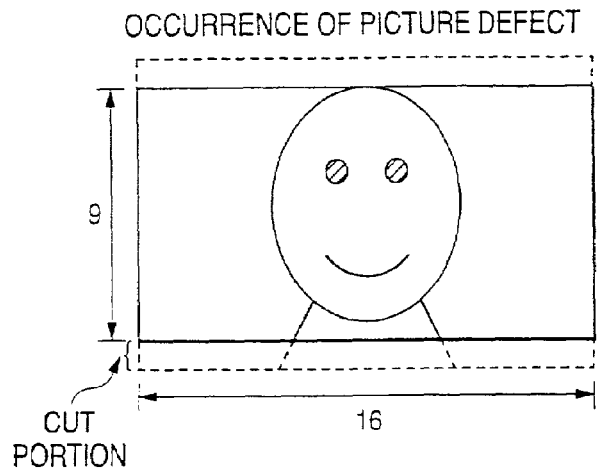
Figure 14C:
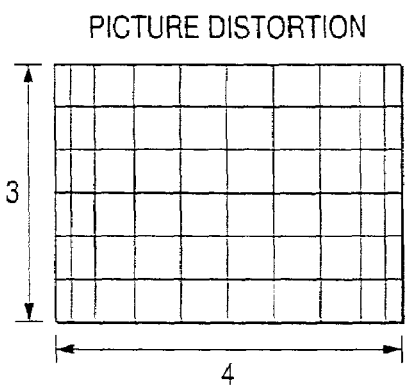
Figure 14F:
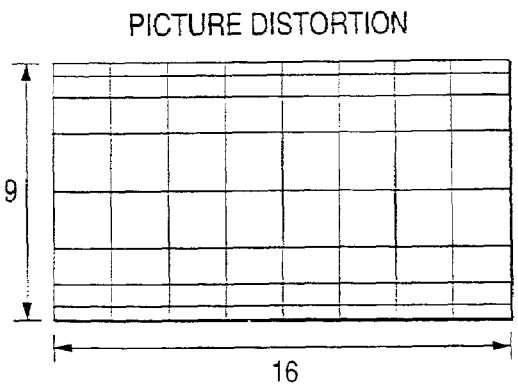

In the case where the picture defect occurs, the image must be shifted in the horizontal direction in the case of FIG. 14B, and the image must be shifted in the vertical direction in the case of FIG. 14E. Thus, an aspect ratio detection flag AF is used for the judgement. In this embodiment, when the aspect ratio is (16:9), the aspect ratio detection flag AF becomes AF=1.

In order to facilitate the detection of flesh color of a human figure, the pair of chrominance signals Cr and Cb are supplied to an IQ conversion circuit 34 and are first converted into an I-axis signal I and a Q-axis signal Q.

Here, a flesh color component Io and a lip component Qo can be respectively expressed as in expression 1.

$$\begin{cases} I_0 = -0.268C_b + 0.736C_r \\ \begin{cases} C_r > C_b \\ Q_0 = 0.413C_b + 0.478C_r \end{cases} \end{cases} \quad \text{[Expression 1]}$$

In this embodiment, in order to decrease a bit amount when arithmetic operation is executed, the expression 1 is approximated by $$\begin{cases} I_0 = -0.25C_b + 0.75C_r \\ \begin{cases} Q_0 = 0.5C_b + 0.5C_r \\ C_r > C_b \end{cases} \end{cases} \quad \text{[Expression 2]}$$

Figure 2:
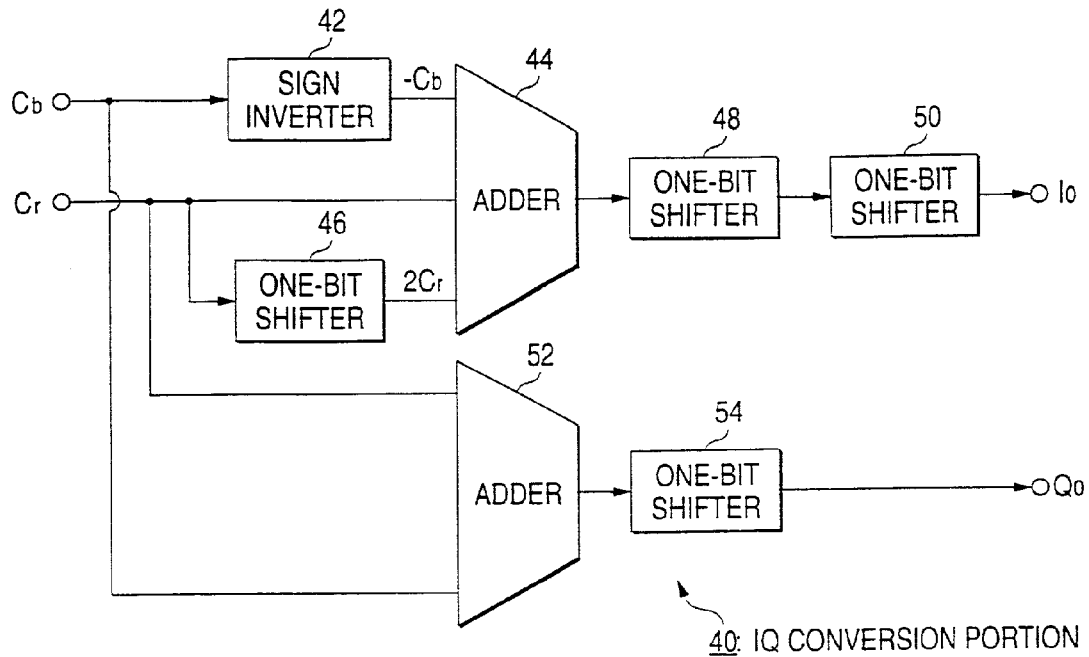
FIG. 2 is a logic diagram of a main portion showing an embodiment of an IQ conversion circuit.

FIG. 2 shows a processing example in this IQ conversion portion 40, and in this example, the color difference signals Cb and Cr digital-converted into 8-bit data are inputted. The sign of the color difference signal Cb is inverted by a sign inverter circuit 42 and it becomes −Cb. The inverted output −Cb is supplied to an adder 44.

The other input color difference signal Cr is supplied to the adder 44. Further, it is also supplied to a one-bit shifter 46, and is bit-shifted by one bit to the left side (left side is made the MSB side), and a double color difference signal 2Cr is obtained. Since this color difference signal 2Cr is also supplied to the adder 44, an addition output of −Cb+3Cr is obtained. This addition output is bit-shifted to the right by one bit by each of one-bit shifters 48 and 50 connected in two stages. As a result, since the addition output is made one fourth, the obtained output Io becomes $$I_0 = -0.25C_b + 0.75C_r.$$

The input color difference signals Cb and Cr are respectively supplied to an adder 52 to be subjected to addition processing, and the addition output is further supplied to a one-bit shifter 54 and is bit-shifted by one bit to the right. As a result, the addition output is halved. Accordingly, by carrying out such arithmetic processing, $$Q_0 = 0.5C_b + 0.5C_r$$

is obtained. Like this, a conversion value indicated by the expression 2 can be obtained by the IQ conversion portion 40.

Next, the conversion values Io and Qo obtained in this way are supplied to a flesh color and lip color detection portion 60, and the flesh color and the lip color of a human figure are respectively detected. Thus, the flesh color and lip color detection portion 60 is constituted by a flesh color detection portion and a lip color detection portion.

Figure 3:
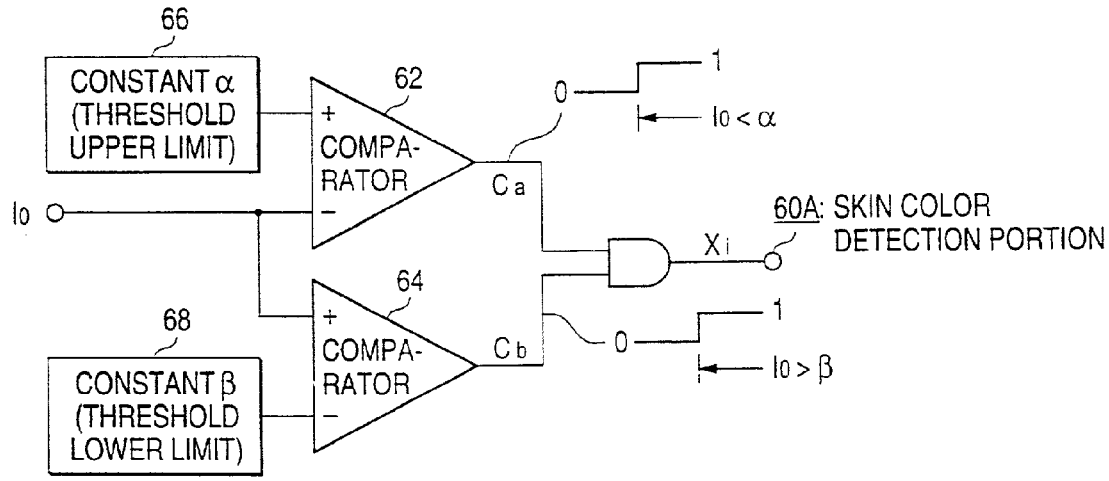
FIG. 3 is a logic diagram showing an embodiment of detection means for detecting flesh color.

FIG. 3 shows an embodiment of a flesh color detection portion 60A. In the flesh color detection portion 60A, the conversion value Io is used, and this conversion value Io is supplied to a pair of comparators 62 and 64. The one comparator 62 is for judging whether the conversion value exceeds the upper limit value of flesh color, and a level comparison with an upper limit value α from a constant unit 66 is made, and when it is not higher than the upper limit value α, a comparison output Ca of "1" (high level) is obtained from the comparator 62.

The other comparator 64 is for judging whether the conversion value is lower than the lower limit value of flesh color, and a level comparison with a lower limit value β from a constant unit 68 is made, and when it is not less than the lower limit value β, a comparison output Cb of "1" is obtained from the comparator 64. These comparison outputs Ca and Cb are subjected to logical product by an AND circuit 70. As a result, when the conversion value Io indicating the flesh color is a value (β<Io<α) within a prescribed range, a flesh color detection output Xi of level "1" is obtained.

Figure 4:
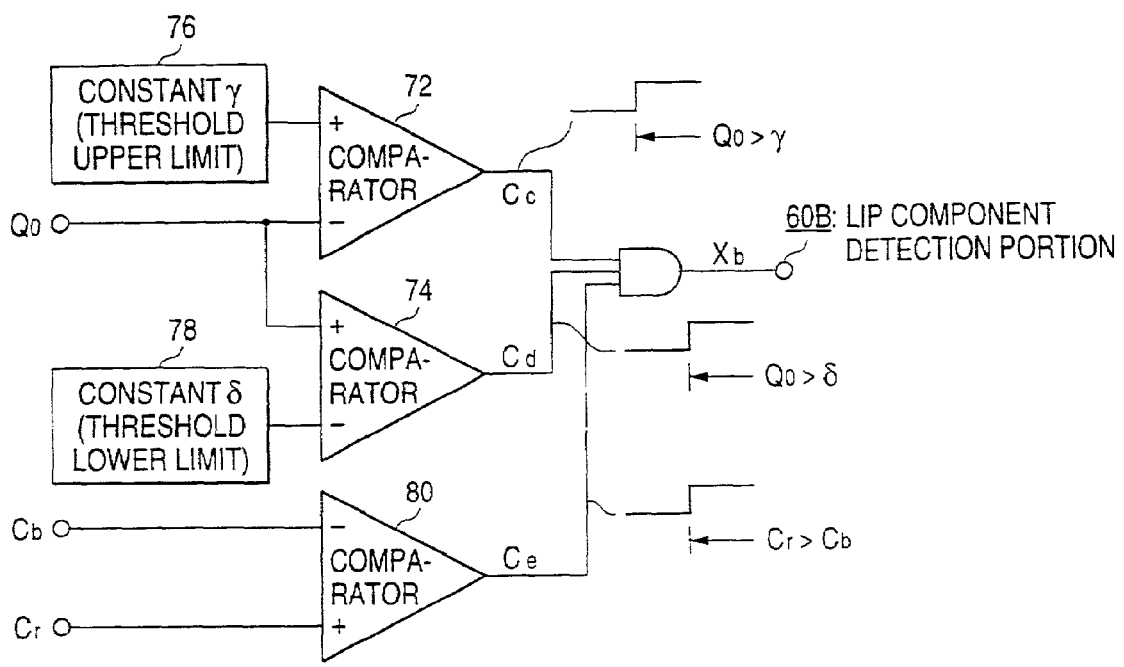
FIG. 4 is a logic diagram showing an embodiment of detection means for detecting lip color.

Next, in a lip color detection portion 60B for detecting lip color, an embodiment of which is shown in FIG. 4, the conversion value Qo is used, and this conversion value Qo is supplied to a pair of comparators 72 and 74. The one comparator 72 is for judging whether the conversion value exceeds the upper limit value of lip color, and a level comparison with an upper limit value γ from a constant unit 76 is made, and when it is not higher than the upper limit value γ, a comparison output Cc of "1" is obtained from the comparator 72.

The other comparator 74 is for judging whether the conversion value is lower than the lower limit value of lip color, and a level comparison with a lower limit value δ from a constant unit 78 is made, and when it is not less than the lower limit value δ, a comparison output Cd of "1" is obtained from the comparator 74. Further, the pair of color difference signals Cr and Cb are supplied to a comparator 80 and their intensities are compared, and when Cr>Cb, "1" is obtained as a comparison output Ce.

These three comparison outputs Cc, Cd and Ce are subjected to logical product by an AND circuit 82. As a result, when the conversion value Qo indicating the lip color is a value (γ<Io<δ) within a prescribed range, and Cr>Cb, a lip color output Xq of level "1" is obtained.

The flesh color detection output Xi and the lip color detection output Xq are supplied to a face area detection portion 86 constituting an arithmetic processing portion 84 shown in FIG. 1. In the face area detection portion 86, when a lip color component exists in the flesh color area, it is judged that the flesh color area is a face of a human figure. Accordingly, the flesh color area at that time becomes a face area.

Figure 5A:
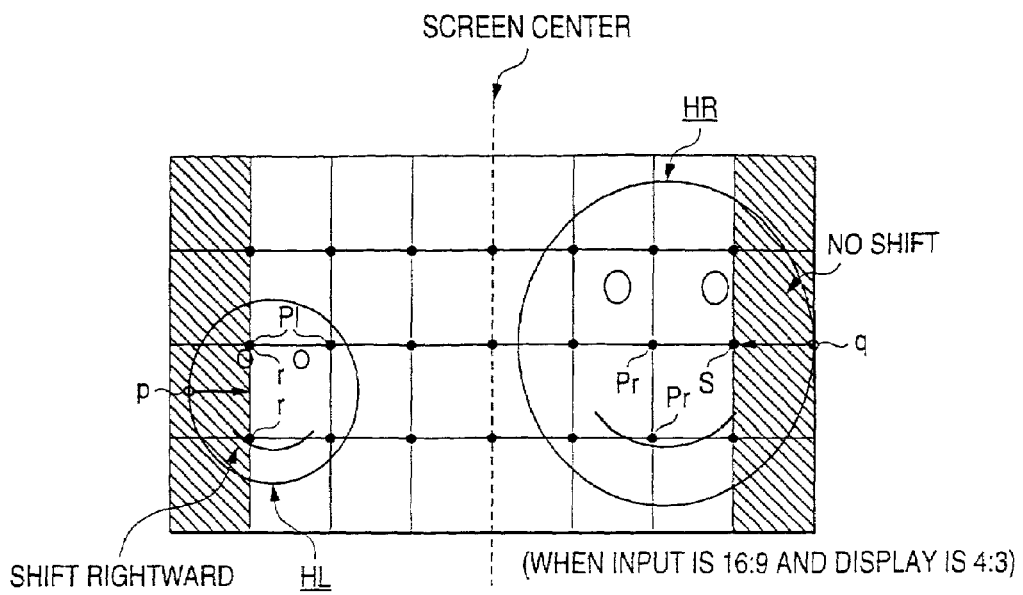
FIGS. 5A and 5B are explanatory views of picture defects on screens of (4:3) and (16:9).
Figure 5B:
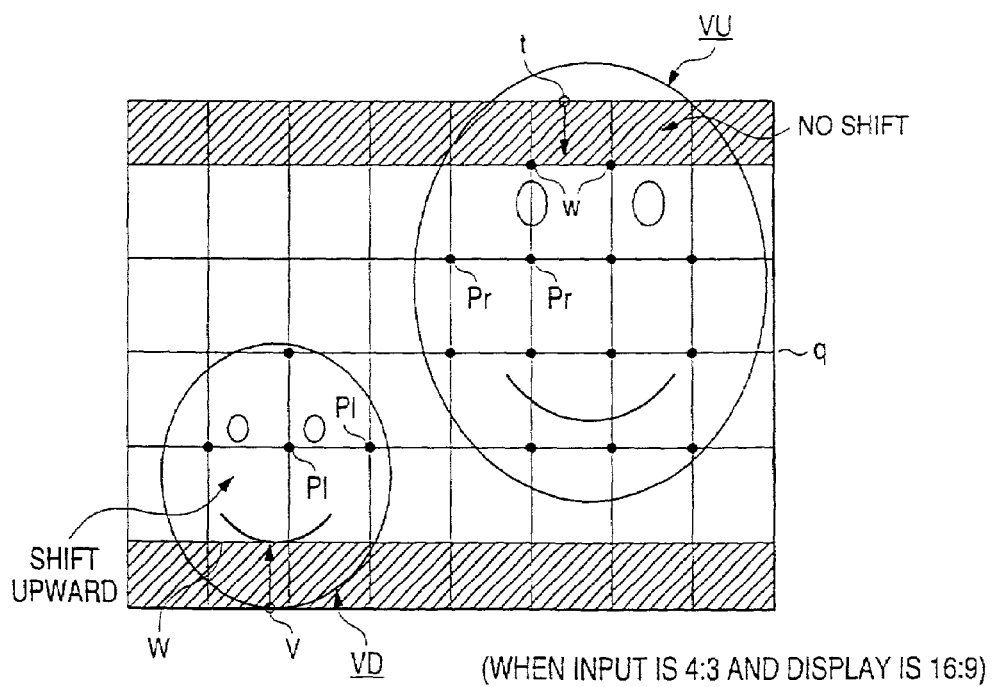

The output indicating the face area is supplied to a picture defect judgement means 90 and an amount of picture defect is judged. Coordinate points of specific noticed pixels as shown in FIGS. 5A and 5B are used for this judgement. For that purpose, (m·n) blocks are prepared, and it is judged whether a prescribed number of coordinate points of the intersections exist in the face area. For example, as shown in FIG. 5A, 24 blocks of m=7 and n=3 in total are considered, and when eight as the number of coordinate points is selected as the prescribed value, when the number of intersections existing in the face area like a right human figure HR of FIG. 5A exceeds this prescribed value, it is judged that the information of the face is sufficiently displaced on the screen, and even if a picture defect occurs, an image display position of the human figure is not changed (shifted).

On the other hand, in the case of a left human figure HL of FIG. 5A, since the number of coordinate points existing in the face area is only four, it is judged that the picture defect is too large in this case, and the display position of the human figure is shifted. Accordingly, when a shift processing is to be carried out, a judgement output D indicating that is obtained from this picture defect judgement means 90. It is assumed that when D=1, the change processing of the image display is carried out.

Thus, this picture defect judgement means 90 is structured such that it is checked whether predetermined coordinate points exist in the face area inputted, and the number of coordinate points is counted, and when it is not larger than the prescribed value, the picture defect judgement output D (D=1) is outputted.

The picture defect judgement output is supplied to a screen shift amount determination means 100. This screen shift amount determination means 100 generates a control signal to carry out an image shift to such a degree that a picture defect does not occur in accordance with the aspect ratio of the inputted image signal. Specifically, although an address control signal to specify a readout start address for the memory means 22 is generated, by way of explanation, with reference to FIGS. 5A and 5B, an explanation will be given of how to generate the readout start address.

FIGS. 6A to 6C are conceptual views showing the relation between a screen size and a memory size when an input image of (16:9) is projected on a screen of (4:3). As described above, a memory is used which has such memory capacity that even the information of an image signal when the aspect ratio is made (16:12) can be written.

As in FIG. 6B, the input image signal is written in a memory region of (16:9) as indicated by hatching. On the other hand, since the screen size is (4:3), a region of an image displayed on the screen becomes a region indicated by double hatching. Accordingly, image regions which are not displayed on the screen exist at both left-right sides of the screen in the horizontal direction.

When a human figure HL indicated by a broken line is projected, for example, at the left side of the image displayed on the screen, and when it is judged that the picture defect is large and the shift judgement output is obtained, a readout start address ADHl (=Xf) of the memory means 22 is set to an address preceding a reference readout start address ADHm (=Xm) in accordance with the amount of the picture defect. By doing so, as in FIG. 6C, the image is projected from a position of a picture defect portion shifted leftward by AHa from the ordinary. As a result, the image of the human figure HL can be displayed on the screen of (4:3) without a picture defect.

Besides, in FIGS. 6A to 6C, when it is judged that a human figure HR as indicated by a broken line at the right side of the screen is displayed and a picture defect occurs, a readout start address ADHr (=Xb) of the memory means 22 in the horizontal direction is set to an address behind a reference readout start address ADHm in accordance with the amount of the picture defect. By doing so, as in FIG. 6A, since the image is projected from a position shifted rightward by ΔHb from the ordinary, a right image from the right picture defect portion is displayed, so that the image of the human figure HR can be projected on the screen of (4:3) without a picture defect.

FIGS. 7A to 7C are explanatory views of a picture defect and its correcting processing when an input image of (4:3) is projected on a screen of (16:9). Since the memory capacity is the same as the case of FIGS. 6A to 6C, an input image signal is written in a memory area like hatching as in FIG. 7B. In that, data of an area of double hatching is read out and is displayed on the screen. Accordingly, image regions which are not displayed on the screen exist at the upper side and lower side of the screen in the vertical direction.

When a human figure VU indicated by a broken line is projected, for example, at the upper side of the image displayed on the screen, when it is judged that a picture defect is large and a shift judgement output D is obtained, a vertical readout start address ADVu (=Yf) of the memory means 22 is set to an address preceding a reference readout start address ADVm (=Ym) in accordance with the amount of the picture defect. By doing so, since the image is projected from a position shifted upward by ΔVa from the ordinary, the image of the human figure VU can be projected on the screen of (16:9) without the picture defect as in FIG. 7A.

Besides, in FIG. 7B, when it is judged that a human figure VD as indicated by a broken line at the lower side of the screen is displayed and a picture defect occurs, a readout start address ADVd (=Yb) of the memory means 22 in the vertical direction is set to an address behind a reference readout start address ADVm in accordance with the amount of the picture defect. By doing so, since the image is projected from a position shifted downward by ΔVb from the ordinary, the image of the human figure VD can be projected on the screen of (16:9) without the picture defect as in FIG. 7C.

Figure 8A:
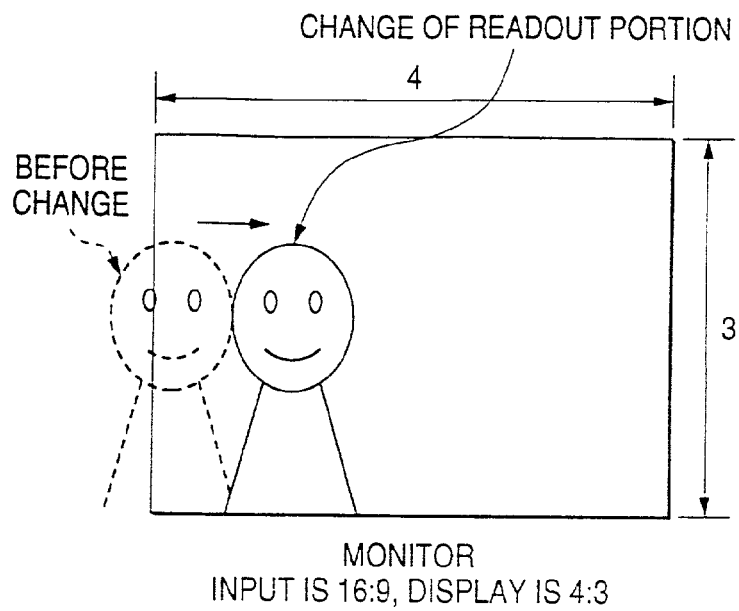
FIGS. 8A and 8B are explanatory views when a picture defect is corrected.
Figure 8B:
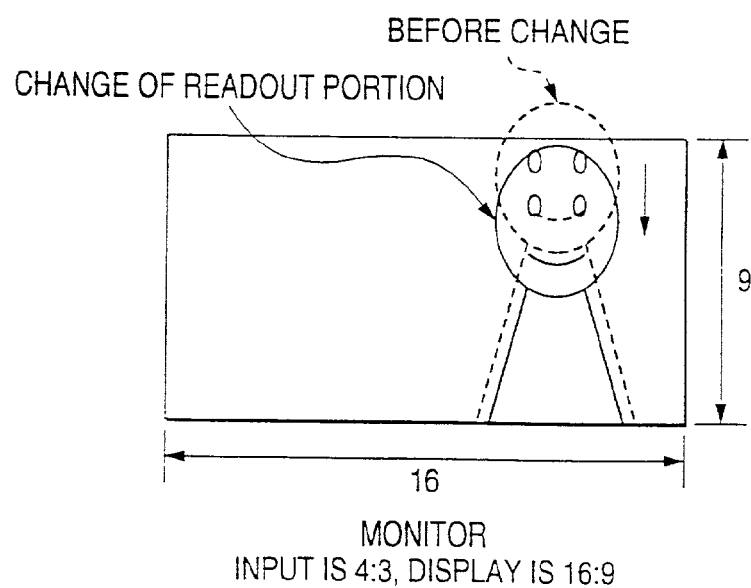

FIGS. 8A and 8B show examples of screens in which the picture defect is corrected by the shift processing. FIG. 8A shows an example of picture defect correction on the screen of (4:3), and FIG. 8B shows an example of picture defect correction on the screen of (16:9).

In order to carry out the readout control processing as described above, an address control signal is supplied from the screen shift amount determination means 100 to the memory control portion 20 of FIG. 1. For that purpose, this screen shift amount determination means 100 uses the foregoing picture defect judgement output, the aspect ratio judgement output, and the output indicating the face area, and generates address control signals ADH and ADV equivalent to the shift amount by the following procedure.

(a) It is judged that the face area is located at which position with respect to the center of the screen in the horizontal and vertical directions. This is for determining the direction to move the screen, and more specifically, this is used as a judgement output for determining whether a readout address in the horizontal direction is controlled or a readout address in the vertical direction is controlled.

The position judgement is carried out by comparing a coordinate point (x, y) of the screen center with coordinate points (x, y) of noticed pixels in the face area for every x coordinate and every y coordinate. The judgement output result indicating the position of the left side, right side, upper side or lower side with respect to the screen center is held.

(b) Amount of Picture Defect is Calculated

In the case of the screen display of (4:3), when the human figure HL is projected on the screen at the left as in FIG. 5A, a distance between a leftmost coordinate point P of a screen positioned in the region judged as the human figure HL and a coordinate point r where the picture defect starts is calculated. The address control signal ADHl corresponding to this distance in the horizontal direction is generated.

Similarly, when the human figure HR is projected on the screen at the right side, a distance between a rightmost coordinate point q of a screen positioned in the region judged as the human figure HR and a coordinate point s where the picture defect starts is calculated. The address control signal ADHr corresponding to this distance in the horizontal direction is generated.

In the case of the screen display of (16:9), as in FIG. 5B, when the human figure VU is projected on the screen at the upper side, a vertical distance between an uppermost coordinate point t in the region judged as the human figure VU and a coordinate point u where the picture defect starts is calculated. The address control signal ADVu corresponding to this distance in the vertical direction is generated.

Similarly, when the human figure VD is projected on the screen at the lower side, a distance between a lowermost coordinate point v in the region judged as the human figure VD and a coordinate point w where the picture defect starts is calculated. The address control signal ADVd corresponding to this distance in the vertical direction is generated.

The address control signals ADH and ADV as described above are supplied to the memory control portion 20, and as a result of the address control as shown in FIGS. 6A to 6C and FIGS. 7A to 7C, even in the case where the aspect ratios are different, the picture defect can be automatically corrected and projection can be made without changing the aspect ratio of the input image signal. By this, an important figure or the like can be projected without the picture defect.

FIG. 9 is a flowchart showing an example in which such address control signal generating processing is carried out. The presence of a flesh color area is detected by using a flesh color detection output Xi, and next, when a lip color component Xq exists in the flesh color area, it is judged that the flesh color area is a face of a human figure (step 101, 102).

Next, the number of coordinate points of noticed pixels existing in the face area is counted (step 103). The noticed coordinate points are intersection coordinates of predetermined blocks as described before, and the number of the coordinate points is compared with a prescribed value (step 104). When the number of the noticed coordinate points is larger than the prescribed value, it is judged that an image region of the human figure on the image screen is sufficient, and in that case, control of a readout start address is not made (step 105). The judgement output D at that time is made D=0.

However, when the number of the noticed coordinate points is not larger than the prescribed value, the judgement output is made D=1, and reference is made to the aspect ratio detection output as a next step (step 106).

When an explanation is made from the point when the detection output with an aspect ratio of (4:3) is obtained, in this case, it is detected whether a face of a human figure displayed on the screen exists at the right or the left with respect to the center of the screen (step 107). In this case, the value (x coordinate) of the center coordinate of the face area is compared with the x coordinate value of the center of the screen, so that it is possible to judge whether the face exists at the right or the left.

When it is judged that the face exists at the left side of the screen, a difference ΔHL between an x coordinate of a horizontal line at the leftmost end of the screen (address start side in memory space) and an x coordinate of the same line in the picture defect region is calculated (step 108).

Then, an address control signal ADHl to advance the readout start address in the horizontal direction by at least this difference ΔHL, specifically, by this difference ΔHL and several pixels to several tens pixels is generated and is outputted to the address control portion (step 109).

At step 107, when it is judged that the face area is positioned at the right side of the screen, a difference ΔHR between an x coordinate of a horizontal line at the rightmost end of the screen (address end side in the memory space) and an x coordinate of the same line in the picture defect region (right picture defect region) is calculated (step 110).

Then, an address control signal ADHr to delay the readout start address in the horizontal direction by at least this difference ΔHR, specifically, by this difference ΔHR and several pixels to several tens pixels is generated and is outputted to the address control portion 20 (step 111).

Next, at step 106, when an aspect ratio detection output AF with an input image signal of an aspect ratio of (16:9) is obtained, it is judged whether a face of a human figure displayed on the screen exists at an upper position or a lower position with respect to the center of the screen (step 112). In this case, by comparing a value (y coordinate) of the center coordinate of the face area with a y coordinate value of the center of the screen, it is possible to judge whether the face exists at the upper position or the lower position.

When it is judged that the face exists at the upper side of the screen, a difference ΔVU between a y coordinate of a vertical line at the uppermost end of the screen (address start side in the horizontal direction in the memory space) and a y coordinate of the same line in the picture defect region is calculated (step 113).

Then, an address control signal ADV1 to advance the readout start address in the vertical direction by at least this difference ΔVU, specifically, by this difference ΔVU and several lines to more than ten lines is generated and is outputted to the address control portion 20 (step 114).

When it is judged that a face area exists at the lower side of the screen at the step 112, a difference ΔVD between a y coordinate of a vertical line at the lowermost end of the screen (address end side in the memory space) and a y coordinate of the same line in the picture defect region (lower picture defect region) is calculated (step 115).

Then, an address control signal ADVd to delay the readout start address in the vertical direction by at least this difference ΔVD, in this example, by this difference ΔVD and several lines to more than ten lines is generated and is outputted to the address control portion 20 (step 116).

The above is the embodiment in which the judgement of the picture defect is carried out by using the flesh color of a human figure or the like. Next, an embodiment of an image display apparatus 10 for carrying out automatic correction to prevent a picture defect of the contents of a telop will be described.

As described above, when an input image of (4:3) is projected on a screen of (16:9) without changing the aspect ratio, as shown in FIG. 14E, picture defects in upper and lower regions occur.

On the other hand, when a telop signal is superimposed on an input image, since this telop signal is usually inserted in a part of the upper and lower faces of the screen, if the image of (4:3) is projected on the screen of (16:9) without changing the aspect ratio, in many cases, a display is carried out in a state where telop characters or the like are missing.

Figure 10:
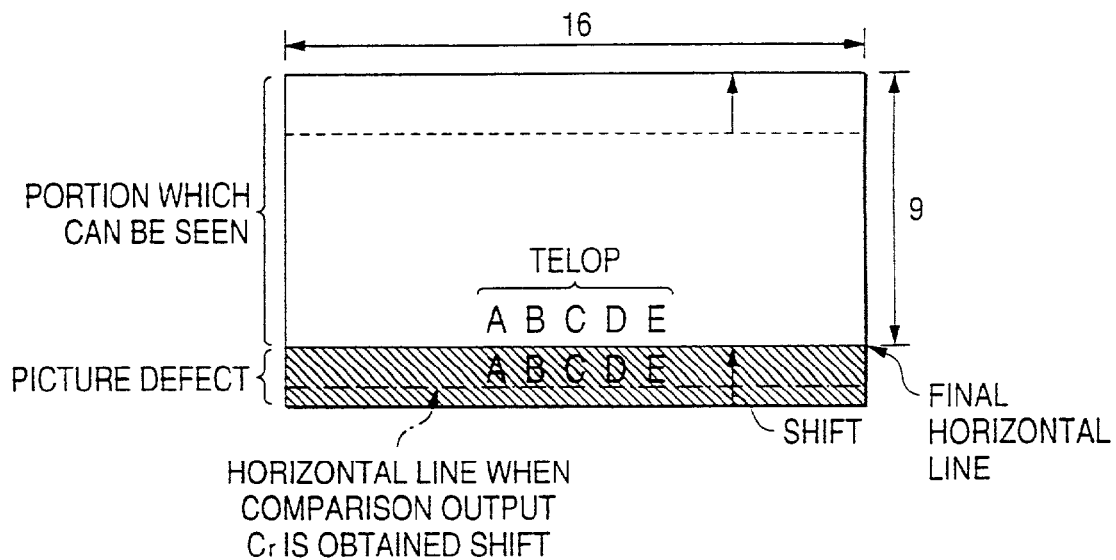
FIG. 10 is a view for explaining a picture defect of a telop.

For example, as shown in FIG. 10, when the telop is inserted to the lower side of the screen and is displayed, there occurs a case where a part of the telop is missing and the contents of the telop can not be read. Then, in the present invention, when the telop signal is superimposed on the image of (16:9), a processing to shift the display image is carried out.

Figure 11:
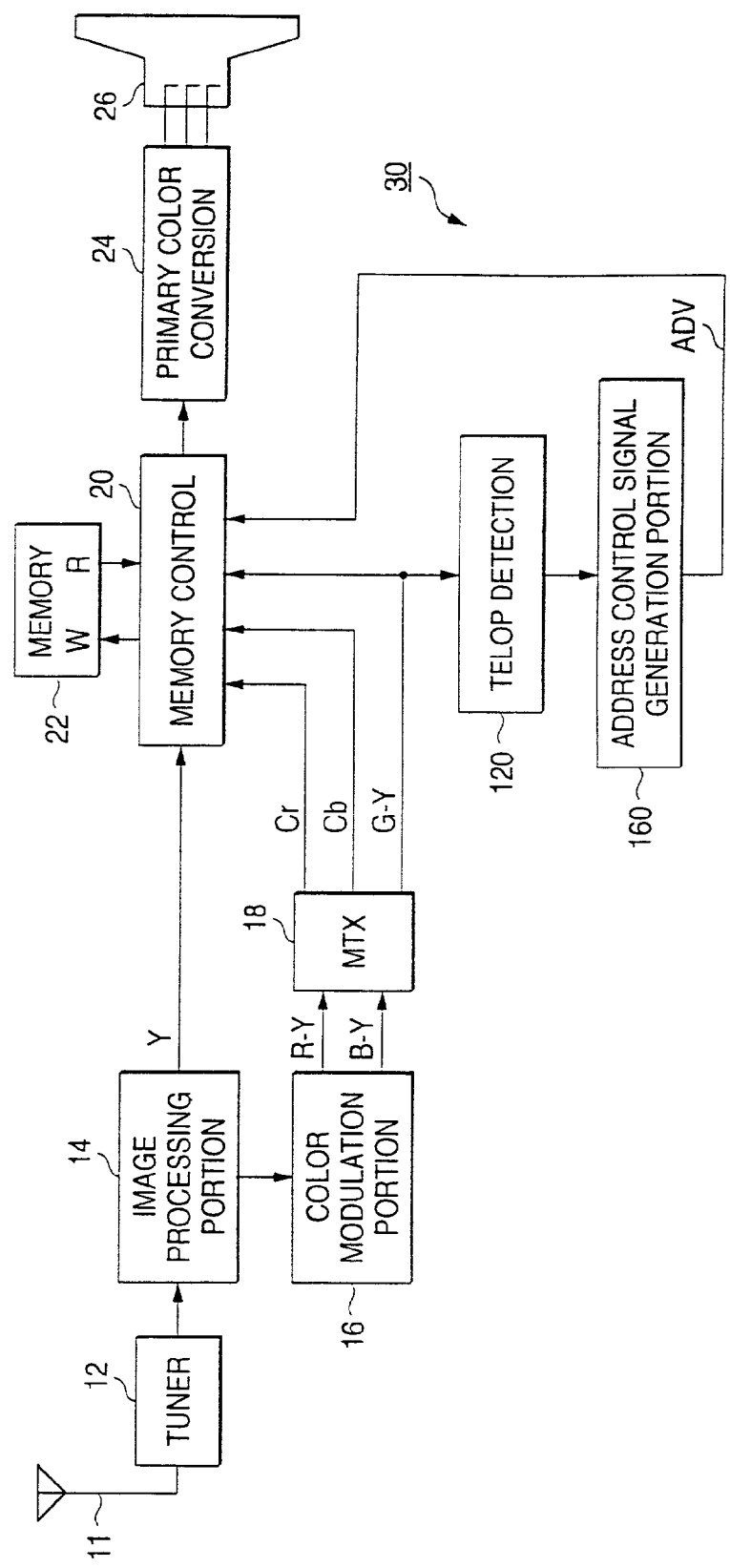
FIG. 11 is a system view of a main portion showing an embodiment of an image display apparatus of the present invention.

FIG. 11 shows an embodiment of an image display apparatus 10 of the present invention. Since the image display apparatus 10 is almost the same as the structure shown in FIG. 1, a description will be given of only a different portion, and a description of the other structure and operation is omitted.

As shown in FIG. 11, in this embodiment, a color difference signal G-Y outputted from a matrix circuit 18 is supplied to a telop detection circuit 120 constituting an address control signal generation means 30. A telop detection output is supplied to a control signal generation portion 160, and an address control signal ADV similar to that in FIG. 1 is generated.

Figure 12:
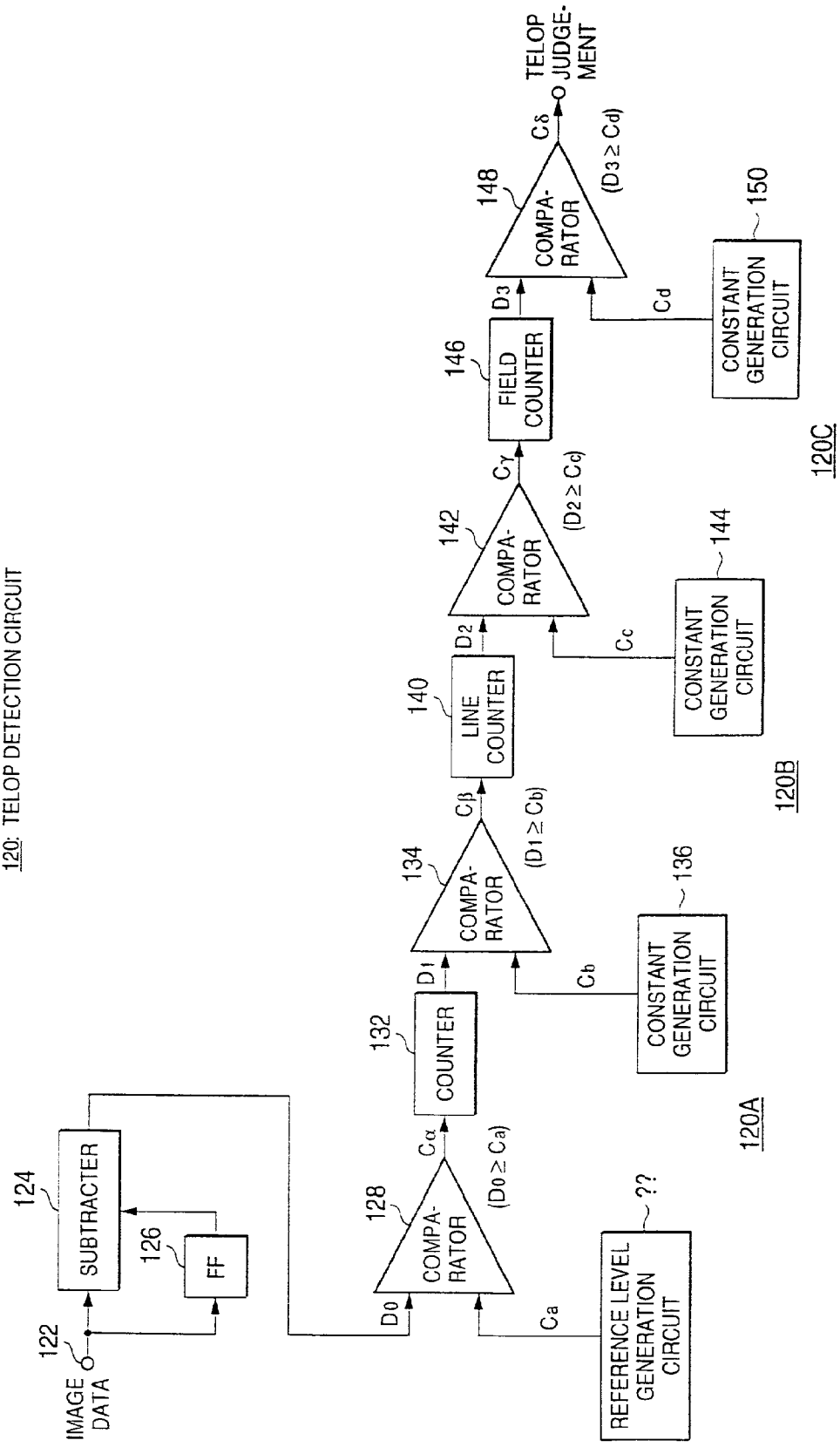
FIG. 12 is a system view showing an embodiment of a telop detection circuit.

An embodiment of the telop detection circuit 120 is shown in FIG. 12.

Figure 13:
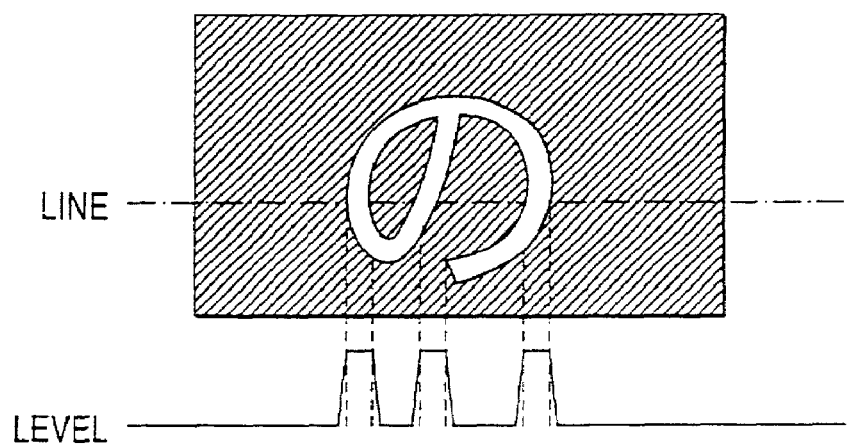
FIG. 13 is an explanatory view showing an example of telop detection.

As shown in FIG. 13, since the luminance level of a telop, such as a character, inserted in an image is high, as in FIG. 13, the presence of the telop can be judged by judging the luminance level. In the state where the telop is displayed, since there are at least two high level changes, if level changes are detected a definite number of times or more in a horizontal line, there is a high possibility that a telop is displayed in that portion. Besides, a telop is continuously inserted over several lines, and the telop continues over several fields. Like this, the telop is judged by detecting luminance information continuous over several fields.

FIG. 12 shows an embodiment of the telop detection circuit 120. Among input image signals such as, for example, color difference signals outputted from the matrix circuit 18, pixel data constituting the color difference signal G-Y having a luminance component is supplied to a subtracter 124 through a terminal 122, and is delayed by the amount of one pixel by a flip-flop circuit 126 and is supplied to the same subtracter 124. By this, a level change between adjacent pixels (difference between pixels) is detected.

A subtraction output Do is supplied to a comparator 128 and is compared with a reference level Ca from a reference level generation circuit 130. Since the luminance level of the telop is normally high and is a white level or a value close to the white level, when the subtraction output Do is not less than the reference level Ca, it is judged that it is a part of a telop. A comparison output Cα is supplied to a counter 132 and the number of luminance level changes existing in one horizontal line is accumulated.

An accumulated value D1 is supplied to a comparator 134 and is compared with a constant Cb from a constant generation circuit 136. When the number of changes of luminance level in one horizontal line is not less than the value Cb, it is tentatively judged that the information with the luminous level changes has a high possibility that the information is a telop. The components up to the comparator 134 constitute a first detection portion 120A.

Next, a comparison output Cβ is further supplied to a line counter 140, and it is judged how many lines continue. An output D2 of the line counter 140 is further supplied to a second comparator 142, and is compared with a constant Cc from a constant generation circuit 144. When it is not less than the constant Cc equivalent to a predetermined number of lines, there is a high possibility that the information inserted in the field is a telop. However, it is not possible to assert that the information is a telop. The components up to this become a second detection portion 120B.

Then, a comparison output Cr of the second comparator 142 is supplied to a field counter 146 constituting a third detection portion 120C, and its counter output D3 is supplied to a third comparator 148 and is compared with a constant Cd from a constant generation circuit 150. When the counter output D3 of the field counter 150 exceeds the constant Cd equivalent to a predetermined field number, it is first judged that the input image information is a telop. Accordingly, when it is judged to be the telop, "1" is first outputted as its comparison output Cδ.

The final comparison output Cδ is supplied to the control signal generation portion 160 shown in FIG. 11, and an address control signal ADV for a memory is generated.

Here, in the case where an input image is displayed on a screen of an aspect ratio different from an aspect ratio of the input, it is settled to what extent the image is missing and is displayed. Then, as shown in FIG. 10, the number of horizontal lines in a difference between the last horizontal line (known value) of a part displayed on the screen and the final detection horizontal line (this corresponds to a horizontal line at which a comparison is made by the second comparator 142 and the comparison output Cγ is outputted) in a detection field when the comparison output Cγ is obtained becomes the number of horizontal lines of the telop in which a picture defect occurs. Accordingly, the readout start position (address) ADV of the memory means 22 is changed by the number of the horizontal lines equivalent to this difference and several lines to more than ten lines.

As shown in FIG. 10, when the telop is displayed at the lower side of the screen, it is appropriate that the readout start address is delayed by ADVd (=Yb) as in FIG. 7C. When the telop is inserted to the upper side of the screen contrary to FIG. 7C, it is appropriate that the readout start address of the memory means 22 is advanced by ADVu (=Yf) from the ordinary as in FIG. 7A.

Although the image display apparatus of the present invention is preferably applied to an image display system such as a television receiver, it is apparent that it can also be applied to other apparatuses such as an image monitor apparatus.

As described above, according to the present invention, in the case where the aspect ratio of a screen is different from the aspect ratio of an input image signal, and in the case where an image is displayed on the screen without changing the aspect ratio of the input image signal, it is judged whether a picture defect has occurred, and when it is judged that the picture defect exceeding a designated level occurs, the image screen is automatically shifted so that the picture defect of the image is prevented.

According to this, while the aspect ratio of the input image signal is kept, a display can be carried out without lack of specific information for a user. Of course, since the screen is automatically shifted (scrolled) without the operation of the user himself, this is very convenient.

Besides, it becomes possible to display an image by scrolling a picture position vertically or horizontally in a state where a face of a human figure or character information as specific information of an inputted image signal is not missing and its circularity is kept.

Accordingly, the present invention is suitably applied to an image display apparatus, such as a television receiver, in which an image is displayed at an aspect ratio different from an aspect ratio of a screen.

What is claimed is:

1. An image display apparatus, comprising:
   memory means for temporarily storing an input image signal;
   memory control means for controlling a readout start address for the memory means;
   display means having an image display screen to which an image signal read out of the memory means is input, the image display screen configured to display the input image signal by increasing an amount of overscan when an aspect ratio of the input image signal is different from an aspect ratio of said image display screen, so as not to change the aspect ratio of the input image signal;
   detection means for detecting the aspect ratio of the input image signal; and
   address control signal generation means to which an aspect ratio detection output is supplied from the detection means, for generating a readout start address control signal for the memory means from the input image signal,
   the address control signal generation means including
      a feature detection means for detecting a feature from said input image signal, a picture defect judgment means for judging a picture defect of the feature based on an output of the feature detection means and for shifting an image display position on the image display screen, the picture defect caused by the increasing of the amount of the overscan, and a screen shift amount determination means for determining, on the basis of the aspect ratio of the input image signal, a shift amount when the image display position is shifted by the picture defect judgment means wherein the readout start address for the memory means is controlled on the basis of the address control signal generated by the readout start address control signal generation means.

2. The image display apparatus according to claim 1, wherein the aspect ratio detection means detects the presence of a non-screen signal in the input image signal so that the aspect ratio of the input image signal is detected.

3. An image display apparatus, comprising:

memory means for temporarily storing an input image signal;

memory control means for controlling a readout start address for the memory means;

display means having an image display screen, which has an aspect ratio of 4:3, to which the image signal read out of the memory means is input, the image display screen configured to display the input image signal by increasing an amount of overscan when an aspect ratio of the input image signal is different from the aspect ratio of the image display screen, so as to not change the aspect ratio of the input image signal;

telop signal detection means for detecting a telop signal superimposed on the input image signal; and address control signal generation means for generating an address control signal to control a readout start address for the memory means when the telop signal is detected;

the address control signal generation means including a feature detection means for detecting a feature from said input image signal, a picture defect judgment means for judging a picture defect of the feature based on an output of the feature detection means and for shifting an image display position on the image display screen, said picture defect caused by said increasing of the amount of said overscan, and a screen shift amount determination means for determining, on the basis of the aspect ratio of the input image signal, a shift amount when the image display position is shifted by the picture defect judgment means wherein the readout start address for the memory means is controlled on the basis of the address control signal generated by the address control signal generation means.

4. The image display apparatus according to claim 3, wherein the telop signal detection means includes:

a first detection portion for detecting a telop signal on a horizontal line;

a second detection portion for continuously detecting a first detection signal over several lines; and a third detection portion for continuously detecting a second detection signal over several fields, wherein when the third detection signal is obtained, it is judged that the telop signal is superimposed on the input image signal.

* * * * *

UNITED STATES PATENT AND TRADEMARK OFFICE
CERTIFICATE OF CORRECTION

| | | |
|---|---|---|
| PATENT NO. | : 7,126,642 B2 | Page 1 of 1 |
| APPLICATION NO. | : 09/956009 | |
| DATED | : October 24, 2006 | |
| INVENTOR(S) | : Aya Takechi et al. | |

It is certified that error appears in the above-identified patent and that said Letters Patent is hereby corrected as shown below:

Column 7, line 36, change "AHa" to --$\Delta$Ha--.

Signed and Sealed this

Third Day of April, 2007

JON W. DUDAS
*Director of the United States Patent and Trademark Office*